US011260579B2

(12) United States Patent
Zitelli et al.

(10) Patent No.: US 11,260,579 B2
(45) Date of Patent: Mar. 1, 2022

(54) METHODS FOR PHOTO-CURING WITH DISPLACEABLE SELF-LUBRICATING SUBSTRATUM FOR THE FORMATION OF THREE-DIMENSIONAL OBJECTS

(71) Applicant: NEXA3D Inc., Ventura, CA (US)

(72) Inventors: Gianni Zitelli, Ciampino (IT); Avi N. Reichental, Carpinteria, CA (US); Luciano Tringali, Rome (IT)

(73) Assignee: NEXA3D Inc., Ventura, CA (US)

( * ) Notice: Subject to any disclaimer, the term of this patent is extended or adjusted under 35 U.S.C. 154(b) by 214 days.

(21) Appl. No.: 15/415,688

(22) Filed: Jan. 25, 2017

(65) Prior Publication Data

US 2017/0129175 A1 May 11, 2017

Related U.S. Application Data

(63) Continuation-in-part of application No. PCT/IT2016/000225, filed on Oct. 3, 2016.

(30) Foreign Application Priority Data

Oct. 2, 2015 (IT) .................. 102015000057527

(51) Int. Cl.
*B33Y 30/00* (2015.01)
*B29C 64/223* (2017.01)
(Continued)

(52) U.S. Cl.
CPC ........ *B29C 64/124* (2017.08); *B29C 37/0067* (2013.01); *B29C 37/0075* (2013.01);
(Continued)

(58) Field of Classification Search
None
See application file for complete search history.

(56) References Cited

U.S. PATENT DOCUMENTS 4,575,330 A 3/1986 Hull
5,122,441 A 6/1992 Lawton et al.
(Continued)

FOREIGN PATENT DOCUMENTS

CN 1058851 A 2/1992
CN 101917925 A 12/2010
(Continued)

OTHER PUBLICATIONS

International Search Report and Written Opinion dated Feb. 6, 2017, from the European Patent Office, for International Patent Application No. PCT/IT2016/000225 (filed Oct. 3, 2016), 9 pgs.
(Continued)

*Primary Examiner* — Armand Melendez
(74) *Attorney, Agent, or Firm* — Ascenda Law Group, PC

(57) ABSTRACT

Three-dimensional objects are formed by photo-curing a liquid polymer by exposure to a radiation in a space between a sheet transparent to the radiation and a supporting plate. On a side of the sheet facing towards the photo-curing liquid polymer, a membrane is arranged. The membrane is transparent to the radiation and covered by a layer of liquid lubricant. The membrane is displaceable with respect to an area in which said liquid polymer is undergoing curing by exposure to the radiation, which radiation (e.g., at 410 nm) may be provided by a collimated light source composed of an array of light emitting diode (LED) sources, an array of baffles, and an array of lenses. The baffles limit beam widths of each individual LED source in the array of LED, and the array of lenses is located one focal length from said array of LED sources.

16 Claims, 11 Drawing Sheets

(51) Int. Cl.
  *B29C 64/124* (2017.01)
  *B29C 37/00* (2006.01)
  *B29C 64/135* (2017.01)
  *B29C 64/40* (2017.01)
  *B33Y 10/00* (2015.01)
  *B29C 64/277* (2017.01)
  *G02F 1/1335* (2006.01)
  *G02F 1/13357* (2006.01)
  *B29C 64/255* (2017.01)
  *B29K 105/00* (2006.01)

(52) U.S. Cl.
  CPC .......... *B29C 64/135* (2017.08); *B29C 64/223* (2017.08); *B29C 64/255* (2017.08); *B29C 64/277* (2017.08); *B29C 64/40* (2017.08); *B33Y 10/00* (2014.12); *B33Y 30/00* (2014.12); *G02F 1/133514* (2013.01); *G02F 1/133603* (2013.01); *G02F 1/133606* (2013.01); *G02F 1/133617* (2013.01); *B29K 2105/0058* (2013.01); *G02F 1/133607* (2021.01)

(56) References Cited

U.S. PATENT DOCUMENTS

| | | | |
|---|---|---|---|
| 5,391,072 A | 2/1995 | Lawton et al. | |
| 5,476,749 A | 12/1995 | Steinmann et al. | |
| 8,663,539 B1 | 3/2014 | Kolodziejska et al. | |
| D734,788 S | 7/2015 | Reches et al. | |
| D777,251 S | 1/2017 | Stand | |
| 2002/0153640 A1 | 10/2002 | John | |
| 2009/0002669 A1* | 1/2009 | Liu | G03F 7/7005 355/67 |
| 2012/0195994 A1* | 8/2012 | El-Siblani | B33Y 10/00 425/174.4 |
| 2013/0241113 A1* | 9/2013 | Geers | B29C 35/0805 264/401 |
| 2014/0191442 A1 | 7/2014 | Elsey | |
| 2015/0027853 A1* | 1/2015 | Findley | B65G 37/00 198/605 |
| 2015/0064298 A1* | 3/2015 | Syao | B29C 64/124 425/169 |
| 2015/0072293 A1 | 3/2015 | Desimone et al. | |
| 2015/0137426 A1* | 5/2015 | Van Esbroeck | B33Y 30/00 264/401 |
| 2015/0145171 A1 | 5/2015 | Walker et al. | |
| 2015/0152270 A1* | 6/2015 | Aizenberg | A61L 29/085 210/500.27 |
| 2015/0352788 A1 | 12/2015 | Livingston et al. | |
| 2016/0046072 A1 | 2/2016 | Rolland et al. | |
| 2016/0046075 A1 | 2/2016 | Desimone et al. | |
| 2016/0046080 A1* | 2/2016 | Thomas | B29C 64/10 264/308 |
| 2016/0052205 A1 | 2/2016 | Frantzdale | |
| 2016/0082655 A1 | 3/2016 | Castanon et al. | |
| 2016/0129645 A1 | 5/2016 | Wighton et al. | |
| 2016/0136890 A1 | 5/2016 | Castanon et al. | |
| 2016/0193786 A1 | 7/2016 | Moore et al. | |
| 2016/0200052 A1 | 7/2016 | Moore et al. | |
| 2016/0229123 A1 | 8/2016 | Carlson et al. | |
| 2016/0263837 A1 | 9/2016 | Goldman et al. | |
| 2016/0288376 A1 | 10/2016 | Sun et al. | |
| 2016/0303793 A1 | 10/2016 | Ermoshkin et al. | |
| 2016/0311158 A1 | 10/2016 | Desimone et al. | |
| 2016/0325493 A1 | 11/2016 | Desimone et al. | |
| 2016/0332386 A1* | 11/2016 | Kuijpers | B33Y 30/00 |
| 2016/0369096 A1 | 12/2016 | Rolland et al. | |
| 2017/0100889 A1* | 4/2017 | Ruiz | B29C 64/106 |
| 2017/0129167 A1 | 5/2017 | Castanon | |
| 2018/0036941 A1* | 2/2018 | Xu | B29C 64/286 |

FOREIGN PATENT DOCUMENTS

| | | |
|---|---|---|
| CN | 102300698 A | 12/2011 |
| CN | 103167946 A | 6/2013 |
| CN | 203766034 U | 8/2014 |
| CN | 104669619 A | 6/2015 |
| CN | 104669621 A | 6/2015 |
| CN | 104875391 A | 9/2015 |
| CN | 105014974 A | 11/2015 |
| CN | 204977481 U | 1/2016 |
| EP | 0171069 A2 | 2/1986 |
| EP | 0484086 A1 | 5/1992 |
| EP | 0506616 A1 | 9/1992 |
| EP | 2226683 A1 | 9/2010 |
| ES | 2588485 T3 | 11/2016 |
| HK | 1215475 A1 | 8/2016 |
| JP | H04301491 A | 10/1992 |
| JP | H06226863 A | 8/1994 |
| JP | 2003039564 A | 2/2003 |
| JP | 2009542484 A | 12/2009 |
| JP | 2018519180 A | 7/2018 |
| WO | 2012021940 A1 | 2/2012 |
| WO | 2015107066 A1 | 7/2015 |
| WO | 2016010946 A1 | 1/2016 |
| WO | 2016081410 A1 | 5/2016 |
| WO | 2016109550 A1 | 7/2016 |
| WO | 2016123499 A1 | 8/2016 |
| WO | 2016123506 A1 | 8/2016 |
| WO | 2016126796 A2 | 8/2016 |
| WO | 2016133759 A1 | 8/2016 |
| WO | 2016140886 A1 | 9/2016 |
| WO | 2016140888 A1 | 9/2016 |
| WO | 2016140891 A1 | 9/2016 |
| WO | 2016145050 A1 | 9/2016 |
| WO | 2016145182 A1 | 9/2016 |
| WO | 2016149097 A1 | 9/2016 |
| WO | 2016149104 A1 | 9/2016 |
| WO | 2016149151 A1 | 9/2016 |
| WO | 2016126796 A3 | 10/2016 |
| WO | 2016172784 A1 | 11/2016 |
| WO | 2016172788 A1 | 11/2016 |
| WO | 2016172804 A1 | 11/2016 |
| WO | 2016172805 A1 | 11/2016 |
| WO | 2017056124 A1 | 4/2017 |

OTHER PUBLICATIONS

Henry, Dr. William, "MicroLED Arrays Find Applications in the Very Small", Photonics Spectra (Mar. 2013), downloaded from: https://www.photonics.com/a53224/MicroLED_Arrays_Find_Applications_in_the_Very, 7 pages.

International Search Report and Written Opinion dated May 24, 2018, from ISA—European Patent Office, for International Application No. PCT/US2018/012774 (filed Jan. 8, 2018), 13 pages.

Vu; et al., "LED Uniform Illumination Using Double Linear Fresnel Lenses for Energy Saving", Energies (2017), 10(2091):1-15.

International Search Report and Written Opinion dated May 4, 2018, from the ISA: European Patent Office, for International Patent Application No. PCT/US2018/015285 (filed Jan. 25, 2018), 13 pgs.

International Preliminary Report on Patentability dated Aug. 8, 2019, from the International Bureau of WIPO, for International Patent Application No. PCT/US2018/015285 (filed Jan. 25, 2018), 8 pages.

International Preliminary Report on Patentability dated Aug. 8, 2019, from the International Bureau of WIPO, for International Patent Application No. PCT/US2018/012774 (filed Jan. 8, 2018), 7 pages.

"MicroCare Food-Grade Mold Release", Krayden, Inc. (2007), Technical Specification, MicroCare, Product Spec PS-120, 1 pg.

Office Action dated Mar. 15, 2021, for Chinese Patent Application No. CN 201880008418.3, 23 pages.

(56) References Cited

OTHER PUBLICATIONS

Chengwei, Wang, "Open the principle of LCD-3D printer LCD 3DPrinter", SINA Blog (May 11, 2013), http://blog.sina.com.cn/solarfirebj, 10 pages.

* cited by examiner

METHODS FOR PHOTO-CURING WITH DISPLACEABLE SELF-LUBRICATING SUBSTRATUM FOR THE FORMATION OF THREE-DIMENSIONAL OBJECTS

CROSS-REFERENCE TO RELATED APPLICATIONS

This is a CONTINUATION-IN-PART of International Application No. PCT/IT2016/000225, filed Oct. 3, 2016, which claims priority to IT102015000057527, filed Oct. 2, 2015.

FIELD OF THE INVENTION

The present invention relates to the field of three-dimensional printing, commonly referred to as 3D printing, and in particular to the technology of 3D printing by means of photo-curing, and, more particularly, relates to a method and apparatus for photo-curing with a displaceable, self-lubricating substratum for the formation of three-dimensional objects.

BACKGROUND

It is known that the field of 3D printing technology by photo-curing can comprise two basic technologies: stereolithographic printing, in which a laser emitting around 400 nm is used, to solidify by means of the beam emitted a photo-curing polymer in the liquid state which is in a special tank; and DLP printing (Digital Light Processing), according to which a photo-curing polymer, again in the liquid state in a tank, is exposed to the luminous radiation emitted by a device similar to a projector.

According to both these technologies, the printing process proceeds making one layer after another, that is, solidifying a first layer adhering to a supporting plate (or extraction plate) and then a second layer adhering to the first layer and so on until formation of the complete object. Therefore, according to this technology, the data representing the three-dimensional object to be formed are organised as a series two-dimensional layers which represent transversal sections of the object.

According to the bottom-up method, applied to machines both of the SLA and DLP type, the plate for extracting the object moves from the bottom upwards, with a layer-by-layer tilting movement. Basically, the method for formation of three-dimensional objects comprises:
  a. a software subdivides the 3D model, provided as input for the printing, in an ordered succession of layers, with the thickness determined according to the technology adopted, the opacity of the polymer, the quantity of the catalyst, the degree of precision to be obtained and the characteristics of the machine provided, usually between 50 and 200 microns, but in any case a succession of a discrete and finite number of layers;
  b. an extraction plate, consisting of a material which is able to facilitate the gluing on itself of the first layer of polymer, moves to a predetermined distance from the first layer and waits for the light beam (SLA or DLP) to solidify the first layer; it then raises by a distance sufficient for the layer just formed to detach from the base of the tank (usually approx. 1 mm) and then lowers by the same distance, less the predetermined distance for the formation of the second layer, and so on until forming the entire object.

The resulting to and fro movement, also called the tilting movement, has two main purposes: it allows the layer just formed to detach from the base of the tank, and at the same time it allows a new quantity of liquid resin not polymerised to interpose between the layer just formed and the base of the container, to allow the refreshing of material still in the liquid state beneath the layer already solidified, for the curing and the formation of the next layer. This tilting movement has an associated tilting time, defined as the time taken for the extraction plate to travel a distance of rising of the plate for the renewal or refreshing of the resin, plus a distance for return to the printing position, less the thickness of the layer to be produced. In our above-cited patent applications, we describe methods and apparatus for the production of three-dimensional objects using a process for the photo-curing of photo-sensitive materials, suitably doped, which allows three-dimensional objects to be made according to a sequential and partially continuous formation process, considerably increasing the speed, the precision, and the mechanical qualities of the final product as compared with what may be obtained using methods of the tilting type.

SUMMARY OF THE INVENTION

According to embodiments of the present invention, three-dimensional objects formed by growth due to the progressive curing of a photo-curing liquid polymer in a space between a sheet transparent to said radiation and a supporting plate that progressively moves away from said transparent sheet are characterised in that on a side of said transparent sheet facing towards said photo-curing liquid polymer a membrane is disposed, said membrane being transparent to said radiation and covered by a layer of liquid lubricant which is released gradually by said membrane, said membrane being displaceable with respect to an area in which said photo-curing liquid polymer is undergoing curing by said radiation thereby resulting in said growth. In various embodiments, the membrane may be made of a self-lubricating polymer, for example a polymer inside of which there is a liquid lubricant. In one embodiment, the self-lubricating polymer is a silicone polymer and the liquid lubricant is silicone oil. Either or both of said silicone oil and said self-lubricating polymer may be enriched with polytetrafluoroethylene (PTFE).

The displacement of the membrane may be lateral (or otherwise) with respect to said area in which said photo-curing liquid polymer is undergoing curing. For example, lateral displacement may be effected by dispensing said membrane from a first reel and taking up said membrane on a second reel, said first and second reels disposed on opposite sides of a tank in which said photo-curing liquid polymer is undergoing curing. Such lateral displacement may occur at times when said supporting plate is raised vertically away from said transparent sheet.

In some embodiments, the photo-curing liquid polymer may undergo curing by irradiation from a collimated light source including an array of light emitting diode (LED) sources. These LED sources may emit radiation at a wavelength between 400-700 nm, and in one embodiment at 410 nm. The collimated light source may include an array of baffles, and an array of lenses, said baffles arranged so as to limit a beam width of each individual LED source in the array of LED sources to approximately a diameter of a lens of the array of lenses, and the array of lenses may be located one focal length from said array of LED sources.

In further embodiments, an apparatus for forming three-dimensional objects by photo-curing a photo-curing liquid polymer by exposure to a radiation includes a tank for collecting said photo-curing liquid polymer, a bottom of the tank having a hole covered by a sheet made of a material transparent to said radiation, and a supporting plate configured to move away from the sheet. On a side of said sheet facing towards said photo-curing liquid polymer, a membrane is disposed, said membrane being transparent to said radiation and being covered by a layer of liquid lubricant which is released gradually by said membrane, wherein said membrane is disposed between a pair of reels opposite one another such that a portion of said membrane between said reels passes through said tank, above said transparent sheet and below said photo-curing liquid polymer.

In some embodiments, the membrane is made with a self-lubricating polymer, inside of which there is a liquid lubricant. The self-lubricating polymer may be silicone and said liquid lubricant may be silicone oil.

Further, a collimated light source may be used to emit said radiation by which said photo-curing liquid polymer undergoes curing. In one embodiment, the collimated light source includes an array of light emitting diode (LED) sources configured to emit radiation at a wavelength between 400-700 nm, and in particular at 410 nm. The collimated light source may also include an array of baffles and an array of lenses, said baffles arranged so as to limit a beam width of each individual LED source in the array of LED sources to approximately a diameter of a lens of the array of lenses, and the array of lenses is located one focal length from said array of LED sources.

These and additional embodiments of the invention are described further below.

BRIEF DESCRIPTION OF THE DRAWINGS

The invention is now described, by way of example and without limiting the scope of the invention, with reference to the accompanying drawings which illustrate embodiments of it, in which.

DETAILED DESCRIPTION

Figure 1:
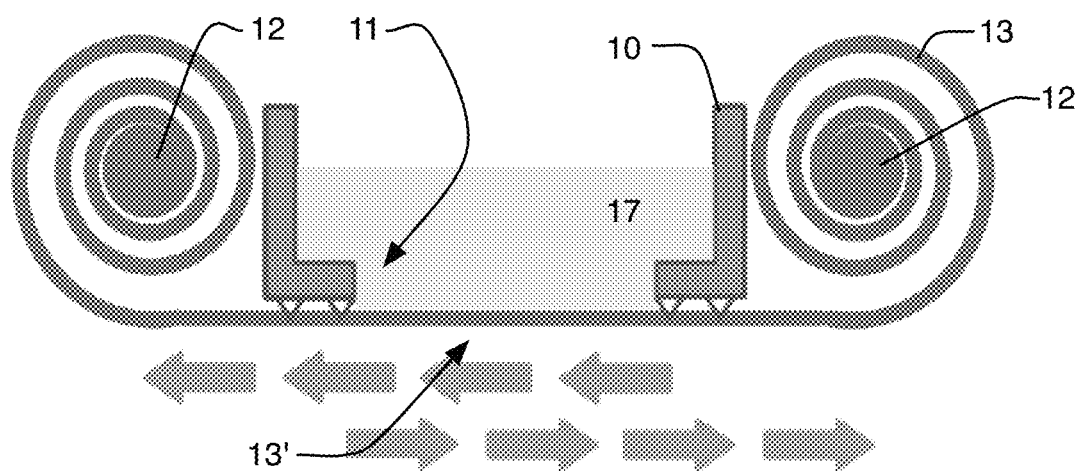
FIG. 1 shows a cutaway view of an apparatus for forming an object by means of photo-curing, in which a displaceable self-lubricating membrane is inserted, in accordance with embodiments of the invention.

In the above-cited patent application, methods and apparatus for photo-curing with self-lubricating substratum for the formation of three-dimensional objects are described. These methods and apparatus propose to eliminate the suction effect (resulting from a vacuum between the surface of the object being formed and a non-stick material positioned beneath it), eliminate the adherences between the layer being formed and the tank base, reduce mechanical stresses introduced by the above-mentioned effects, and provide a process for forming three-dimensional objects in much shorter times compared with conventional solutions. In particular, such methods and apparatus for photo-curing with self-lubricating substratum for the formation of three-dimensional objects involved the interposing, between the base of the tank and the photo-curing liquid polymer, of a membrane, which membrane is transparent to the electromagnetic spectrum of interest and is able to gradually release a layer of lubricating material which allows the polymer, suitably doped, to solidify, remaining suspended on the layer of lubricating material. Our proposed methods and apparatus thereby overcome the limitations of previous solutions and obtain desired technical results.

Now, in one embodiment of the present invention, a method for forming three-dimensional objects by photo-curing a liquid polymer (sometimes known as a resin) through exposure to a radiation is provided. In the present method, three-dimensional objects form by growth, due to the progressive curing of the liquid polymer, in a space of a tank between a sheet transparent to the radiation and a supporting plate on which already formed portions of said objects adhere. The supporting plate progressively moves away from said transparent sheet during said growth. This embodiment of the invention is characterised in that on the side of said transparent sheet facing towards the photo-curing liquid polymer, a membrane is disposed. The membrane is transparent to the radiation (which in some instances may be at 410 nm) and is covered by a layer of liquid lubricant which is released gradually by said membrane. During growth of the object, the layer of liquid lubricant is displaced (e.g., laterally, radially, circumferentially, or otherwise) with respect to areas of the photo-curing liquid polymer undergoing progressive curing, thereby facilitating replenishment of the layer of liquid lubricant. In some instances, displacement of the liquid lubricant may be effected by displacement or replacement of a sheet of the membrane during said growth. As discussed in our above-cited patent application, the photo-curing liquid polymer may contain a volume (e.g., up to 5% of the total volume of the liquid polymer) of the liquid lubricant.

As discussed further herein, in one embodiment of the invention an apparatus for forming three-dimensional objects by photo-curing a photo-curing liquid polymer by exposure to a radiation is of the type comprising a tank for containing said photo-curing liquid polymer, the bottom of the tank having a hole covered by a sheet, said sheet being made of a material transparent to said radiation (which in some instances may be at 410 nm), and a supporting plate designed to move away from the sheet. This embodiment of the invention is characterised in that, on the side of said transparent sheet facing towards said photo-curing liquid polymer, a membrane is disposed. The membrane is transparent to said radiation, and is covered by a layer of liquid lubricant, which is released gradually by said membrane. To facilitate the displacement referenced above, the membrane may be organized as a roll drawn between two reels, one each placed on opposing sides of the tank, with a portion of the membrane between them so that the portion of the membrane is disposed beneath the supporting plate and the photo-curing liquid polymer and above the transparent sheet covering the hole. The arrangement may resemble, broadly, a typewriter ribbon drawn between two spools and disposed across a type guide within a typing field of the machine.

During fabrication of a three-dimensional object, one or more stepper motors, each with appropriate end effectors, may act on the reels, and/or the membrane, so as to displace the portion of the membrane drawn between the reels with respect to a working area of the tank in which said photo-curing liquid polymer is undergoing progressive curing, taking up the membrane on one roller while dispensing it from the other. Such displacement may be bidirectional or unidirectional, and facilitates replenishment of the layer of liquid lubricant in the working area of the tank, thereby allowing for rapid, and continuous, printing. A mask within the tank may be disposed around the working area between the reels to contain the photo-curing liquid polymer. The membrane may be made with a self-lubricating polymer, i.e., a polymer inside of which there is a liquid lubricant, and in one embodiment said polymer is silicone and said liquid lubricant is silicone oil, with a viscosity of between 50 and 1000 $mm^2$/s (defined according to the centistoke model cSt at 23° C.), preferably between 300 and 400 $mm^2$/s. Polytetrafluoroethylene (PTFE) may also be present inside the membrane.

In our previous patent application, we noted that by providing the (static) layer of lubricating oil released by the membrane, the twin problems of detachment of a layer of cured liquid polymer just formed from the tank base and the refreshing of the liquid polymer between the layer just formed and the tank base were addressed. We explained, however, that in cases where the cross section of the object being formed is sufficiently large such that the refreshing time of the liquid polymer is greater than its polymerisation time, the system is forced to stop to allow the completion of the refreshing of the liquid polymer. In other words, printing is no longer continuous, but sequential.

The present invention addresses this issue. By displacing the layer of liquid lubricant with respect to areas of the photo-curing liquid polymer undergoing progressive curing (e.g., by drawing the membrane from one reel and gathering it up on the other when the supporting plate is moving vertically), the refresh time of the liquid polymer can be reduced. This is because there exists a viscous friction between the membrane and the liquid polymer. As a portion of the membrane moves (e.g., laterally, radially, circumferentially, or otherwise) from underneath the area of the liquid polymer undergoing curing, it drags a volume of liquid polymer from an adjacent area with it. Thus, by displacing the membrane with respect to areas of the photo-curing liquid polymer undergoing progressive curing, not only is the layer of liquid lubricant under said area replenished, so too is the volume of liquid polymer under said area refreshed more quickly than would otherwise be the case if the membrane were not so displaced. This has the effect of alleviating the need for the system to interrupt the printing process for larger object cross sections being formed.

In effect then, according to the methods and apparatus for photo-curing with a self-lubricating substratum for the formation of three-dimensional objects of the present invention, the provision of a displaceable layer of lubricating oil released by the membrane gradually over time allows two characteristic problems of the traditional bottom-up systems to be resolved: that is, the detachment of the layer just formed from the tank base, and the refreshing of the liquid polymer between the layer just formed and the tank base. The polymer in the liquid state, suitable doped, remains suspended on the lubricant layer as it hardens, and no longer contacts the base of the tank, hence, there is no need to detach the layer which has just been formed from said base.

In our above-cited prior patent application, we described methods and apparatus for making a three-dimensional object in which the object is formed from the bottom upwards, and the photo-curing of a liquid polymer is effected using a luminous flow from a digital light processing (DLP) projector. The liquid polymer may be suitably doped with ultraviolet catalysts (sensitive in the bandwidth of the luminous flow produced by the DLP projector) and lubricating substances. This arrangement allowed for rapid object growth (with printing speeds on the order of 1.8 min/cm for layers of 200 micron thickness), but at limited x-y resolution (e.g., 75 microns). Further, because of the need for significant light intensities to cure the liquid polymer, the DLP projector must be positioned close to the work space, limiting the area over which the liquid polymer curing can be effected (e.g., on the order of 120×90 mm). This proximity of the DLP projector to the work space also introduces optical aberrations and distortions in the focal plane.

Embodiments of the present invention address these deficiencies by eliminating the use of a DLP projector and replacing it with a collimated light source that emits a light beam with a wavelength of approximately 410 nm (or, more generally, within a wavelength region of 400-700 nm). The light source comprises, in one embodiment, an array of light emitting diodes (LEDs) whose outputs are constrained by individual beam directors (or baffles) and collimated by a lens array. The resulting collimated light beam is used to illuminate a liquid crystal display (LCD) located within the tank containing the liquid polymer, below the above-described membrane. The LCD is under computer control so as to render a representation of the image of the cross section of the object to be printed such that the collimated light beam passes through those portions of the LCD not rendered opaque to the wavelength of the incident radiation and effects photo-curing of the liquid polymer in the work space of the apparatus immediately above the LCD. This arrangement affords high resolution in the x-y plane (e.g., on the order of approximately 50 microns or less, and in one embodiment approximately 30 microns), free from optical aberrations or distortions, while preserving rapid printing speeds. This high resolution collimated light source and LCD imaging system may be employed with the static membrane which produces the lubricant layer discussed in our prior patent application, or with the displaceable membrane described herein.

With reference to FIG. 1, a cross section of a portion of a collection tank 10 of an apparatus for photo-curing with self-lubricating substratum for the formation of three-dimensional objects according to this invention has, in a central position, a hole 11, which allows the passage of an incident luminous flow coming from a light source (not shown) located beneath the tank 10. The hole 11 is covered by a sheet (not shown), which may be made of borosilicate or quartz, or in general of a material transparent to the UV spectrum of interest for the photo curing, and more specifically, in the systems which use the collimated light source described herein, transparent to the electromagnetic spectrum in the range 400-700 nm, and more particularly, 410 nm. The sheet positioned on the base of the tank 10 prevents the escape of the liquid photo-curing polymer 17 contained in the tank.

Figure 2:
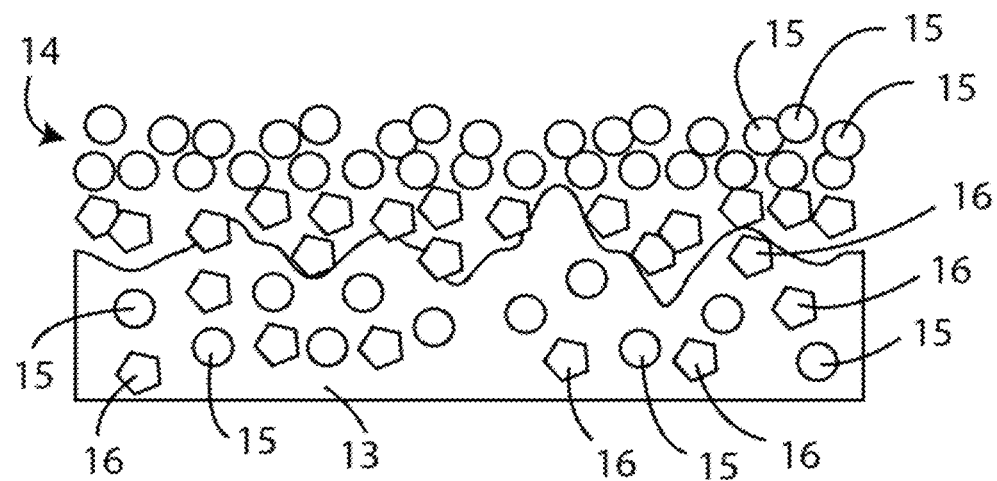
FIG. 2 shows a schematic view of the operation of the self-lubricating membrane.

Above the sheet there is a membrane 13, made of a self-lubricating, silicone-based polymer with a low friction coefficient and a high resistance to wear, which is able to release (as shown in FIG. 2) a layer of silicone oil and non-stick material, labelled 14, which in the present system performs the role of buffer between the membrane 13 and the photo-curing polymer 17, the purpose of which is to prevent the triggering of the suction effect and the mechanical adherence characteristic of conventional bottom-up systems, and for that reason is indicated below as inhibiting layer 14. The liquid polymer 17, remaining suspended above the inhibiting layer 14, allows for the fabrication process according to this invention and described herein.

In the illustrated embodiment, membrane 13, which is transparent to the luminous flow from the light source, is organized as a roll drawn between two reels 12, one each placed on opposing sides of the tank 10, with a portion 13' of the membrane between them. This portion 13' of the membrane is disposed beneath a supporting plate (not shown), which progressively moves vertically, away from the tank 10 during growth of the object under fabrication, and the photo-curing liquid polymer 17, and above the transparent sheet discussed above.

During fabrication of a three-dimensional object, one or more stepper motors (not shown in FIG. 1), each with appropriate end effectors, may act on the reels 12, and/or the membrane 13, so as to displace the portion 13' of the membrane drawn between the reels with respect to a working area of the tank 10 in which the photo-curing liquid polymer 17 is undergoing progressive curing, taking up the membrane on one roller while dispensing it from the other. Such displacement may be bidirectional or unidirectional, and facilitates replenishment of the layer of liquid lubricant in the working area of the tank, thereby allowing for rapid, and continuous, printing. A mask within the tank may be disposed around the working area of the apparatus between the reels to contain the photo-curing liquid polymer. The membrane may be made with a self-lubricating polymer, i.e., a polymer inside of which there is a liquid lubricant, and in one embodiment said polymer is silicone and said liquid lubricant is silicone oil, with a viscosity of between 50 and 1000 $mm^2$/s (defined according to the centistoke model cSt at 23° C.), preferably between 300 and 400 $mm^2$/s. Polytetrafluoroethylene (PTFE) may also be present inside the membrane.

An example of the displacement of the portion 13' of the membrane 13 is shown in FIGS. 3A-3E. As shown in these illustrations, object 18 is formed by photo-curing of polymer 17 in desired patterns (defined by appropriate cross-sections of said object), which is displaced on a layer 14 of a self-lubricating, silicone-based polymer and non-stick material 16, which together form a buffer between the membrane 13 and the photo-curing polymer 17. Silicone oil (dissolved inside the membrane in the form of pellets denoted with numeral 15) is a lubricant which, when it is present in the self-lubricating polymer with which the membrane 13 is made, migrates from the inside of the material towards the outside, until reaching the surface, even during the use of the membrane 13, thereby contributing to the reduction of the friction and generating an inhibiting substratum 14 above which the polymer 17, still in the liquid state, remains suspended. Inhibiting layer 14 helps prevent the triggering of the suction effect and the mechanical adherence of cured portions of the liquid polymer 17 during the fabrication process. The presence of PTFE in the lubricant (and/or in the silicone polymer used to make the membrane) improves the lubrication characteristics, reduces the friction and improves the duration of the membrane 13 reducing the wear, but it is not essential.

In various embodiments, silicone-based polymers with a thickness of the membrane between 0.50 mm and 2.50 mm, Shore hardness between 55 and 70, failure load from 8 to 10 MPa, and percentage elongation at failure from 300 to 400 may be used. More specifically, by way of example and without limiting the scope of the invention, the lubricant contained in the membrane 13 may consist of a silicone oil with a viscosity of 50 to 1000 $mm^2$/s, and in particular 350 $mm^2$/s (defined according to the centistoke model cSt at 23° C.), however, it is possible to use silicone oils with various viscosities, in a range of between 50 and 1000 $mm^2$/s. PTFE 16 (which tends to migrate towards the outside of the membrane 13 before the silicone oil 15, creating a substrata which reduces the roughness of the membrane 13) can be added to the oils and other lubricating products can be used such as resins for releasing moulds such as, for example, resin 9515 by Siliconi Padova. By way of an example, it is possible to use as a lubricant fluid resin 9515 from Siliconi Padova, as well as silicone oils of the Rhodorsil Huile 47 V 50 type also supplied by Siliconi Padova, produced by BlueStar Silicones.

With regard to the choice of photo-curing polymers 17, it is possible to use conventional resins, preferably with the addition of lubricant of the same type as that contained in the membrane 13. This enables the mechanical suction effect and the dilution of the lubricant contained in the membrane 13 by the liquid polymer to be reduced. In some embodiments, the percentage of lubricant dissolved in the photo-curing liquid polymer may be on the order of 4-6%, but other quantities of lubricant can be used according to the solubility and the desired characteristics of the solidified material. In effect, the greater the quantity of lubricant, the more the solidified surface is opaque and with a satin finish. Specific examples of resins which may be used in accordance with the present invention are described in our above-cited patent application.

Figure 3A:
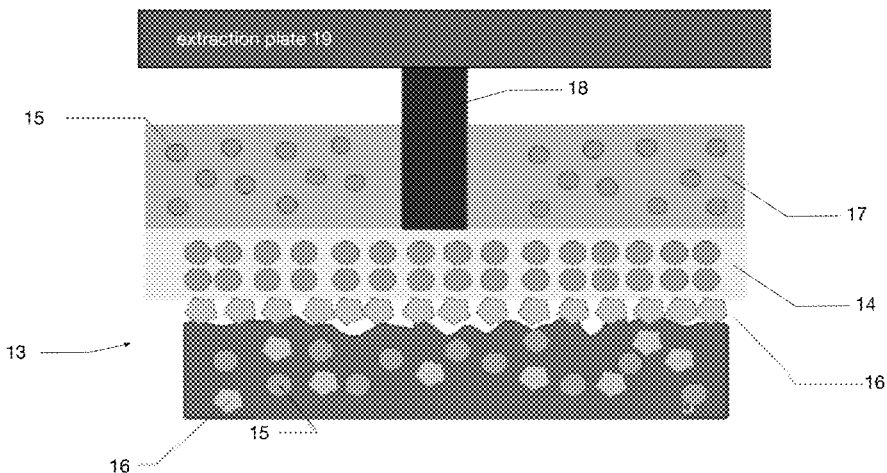
FIGS. 3A-3F show the displacement of the self-lubricating membrane during growth of an object under fabrication by photo-curing according to embodiments of the invention.
Figure 3B:
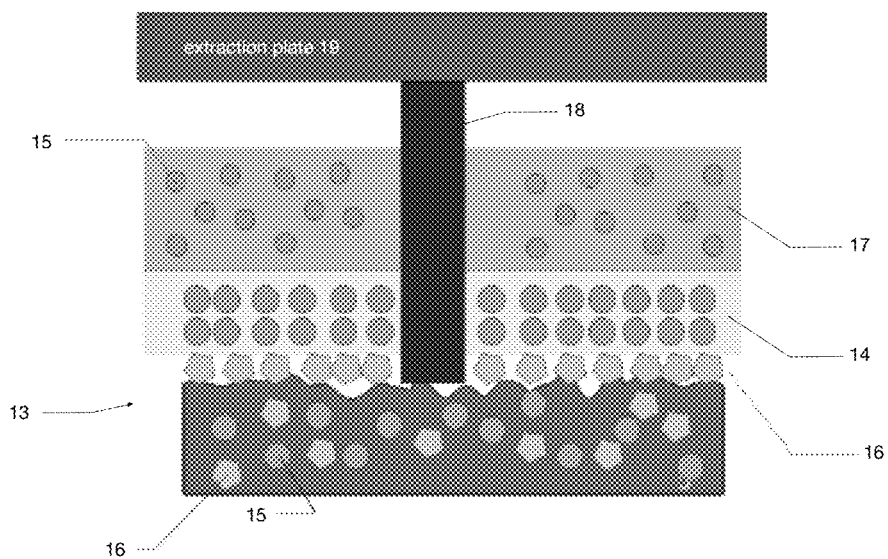
Figure 3C:
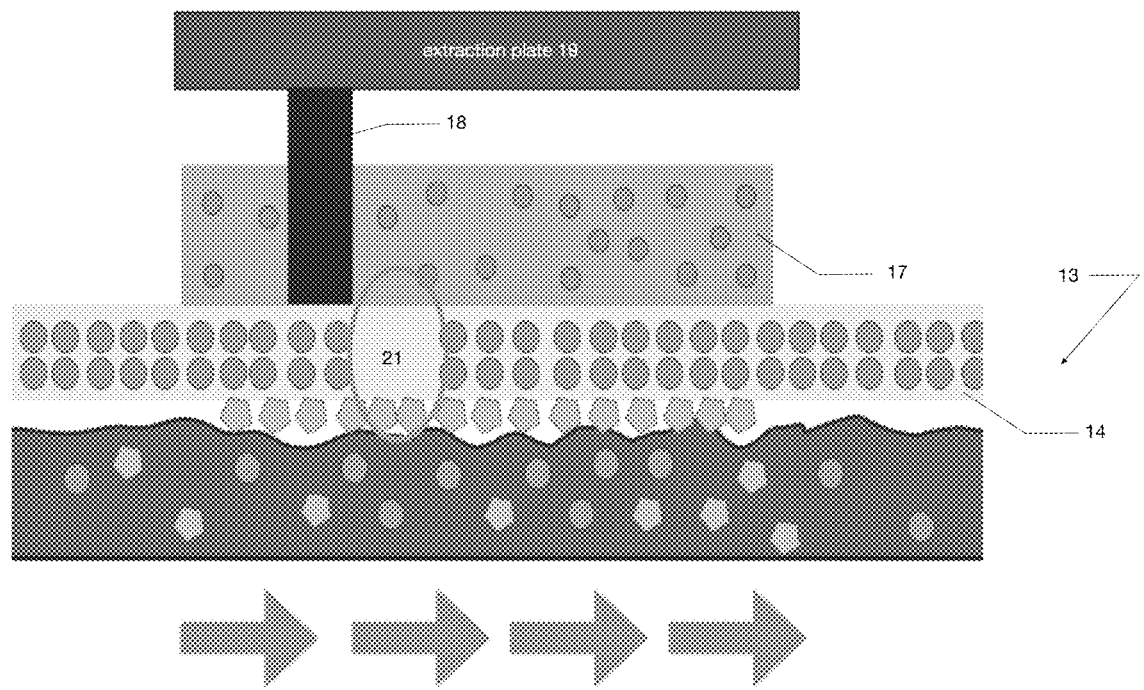
Figure 3D:
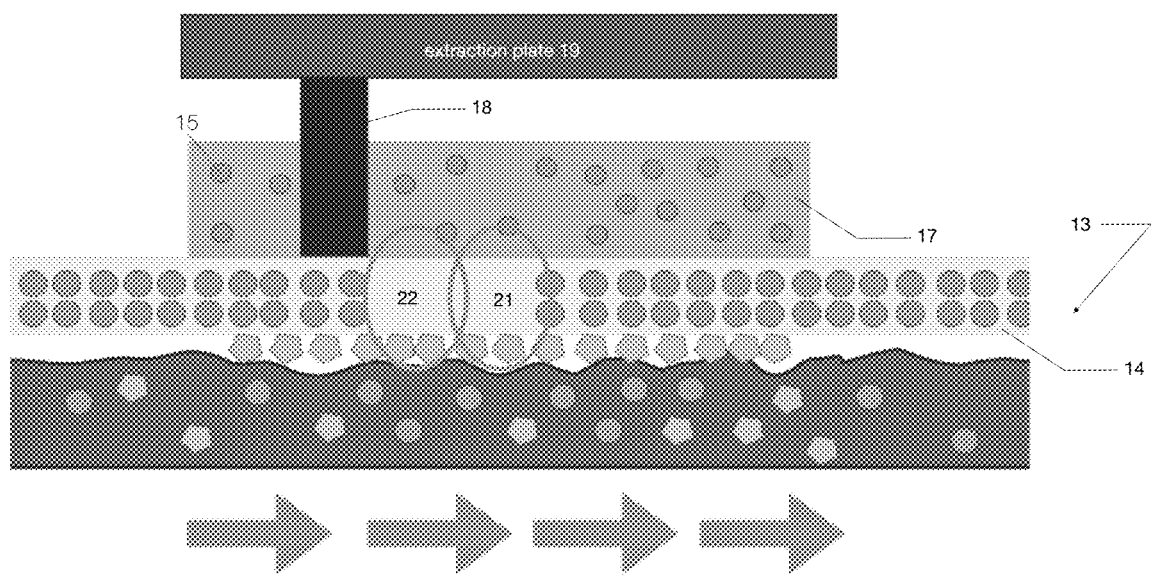
Figure 3E:
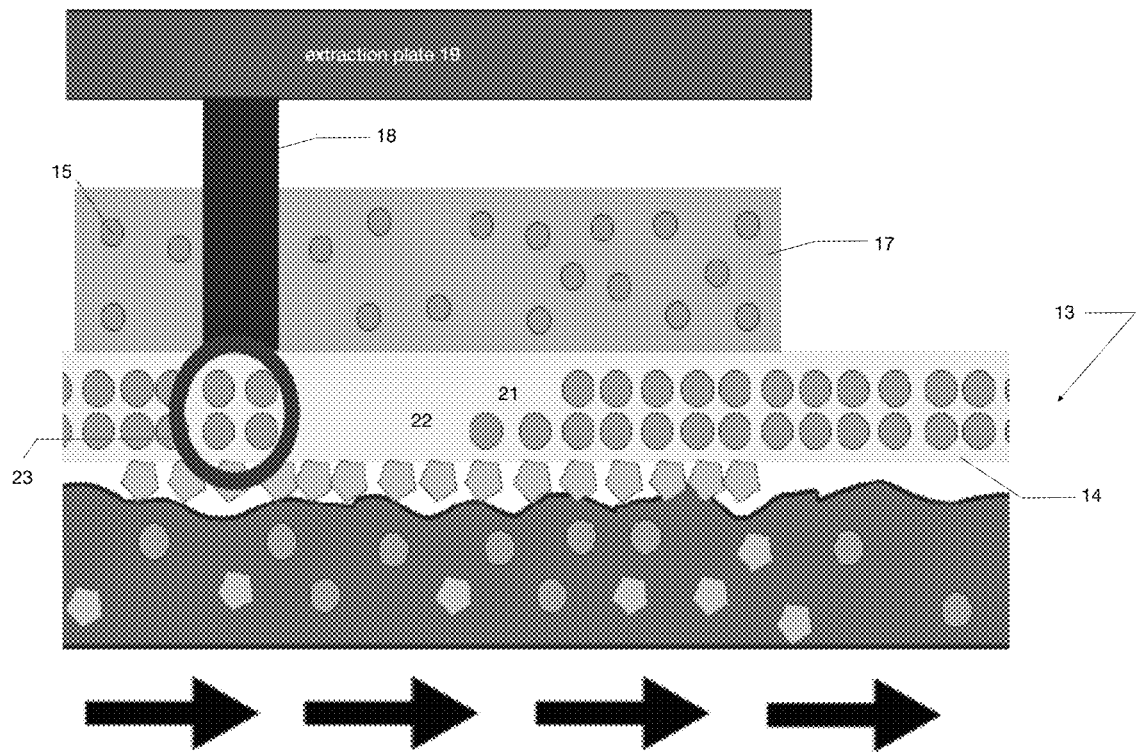

As shown in FIGS. 3A and 3B, during the formation of object 18, the lubricating material which covers the membrane 13 tends to be removed. This reduction of the inhibiting layer 14 results in the contact of the resin (that is, the photo-curing liquid polymer) 17 with the membrane 13, generating the same kind of undesired effects known in conventional bottom-up systems. In order to limit this problem, the self-lubricating membrane 13 is preferably made displaceable with respect to the working area of the tank in which the object 18 is undergoing formation. For example, as shown in FIGS. 3C-3D, during growth of the object 18, the layer of liquid lubricant is displaced (e.g., laterally) with respect to areas of the photo-curing liquid polymer undergoing progressive curing, thereby replenishing of the layer of liquid lubricant under the area of said growth. In the illustrated example, displacement of the liquid lubricant is effected by lateral displacement of a sheet of membrane 13 during said growth. The lateral displacement of membrane 13 is achieved by drawing the membrane sheet between reels 12, as shown in FIG. 1, at times when the extraction plate 19 moves vertically, away from the photo-curing liquid polymer 17, during growth of the object 18. With reference to FIG. 3E, as the membrane is so displaced, areas 21, 22 of inhibiting layer 14 that have been consumed during growth of object 18 are moved away from the working area, allowing these areas to be replenished from the membrane 13. Further, the working area is provided fresh layers of liquid lubricant 23 during the growth process.

The foregoing example describes lateral displacement of membrane 13 (and in particular inhibiting area 14) with respect to the areas of the liquid polymer 17 in which photo-curing of the liquid polymer is taking place, thereby effecting growth of object 18. In other embodiments, the membrane may be disposed on a circular platen and drawn away from a centre thereof in a radial fashion. In still other embodiments, the membrane may be in the form of replaceable sheets, which sheets are replaced in whole, periodically, during growth of object 18.

Figure 3F:
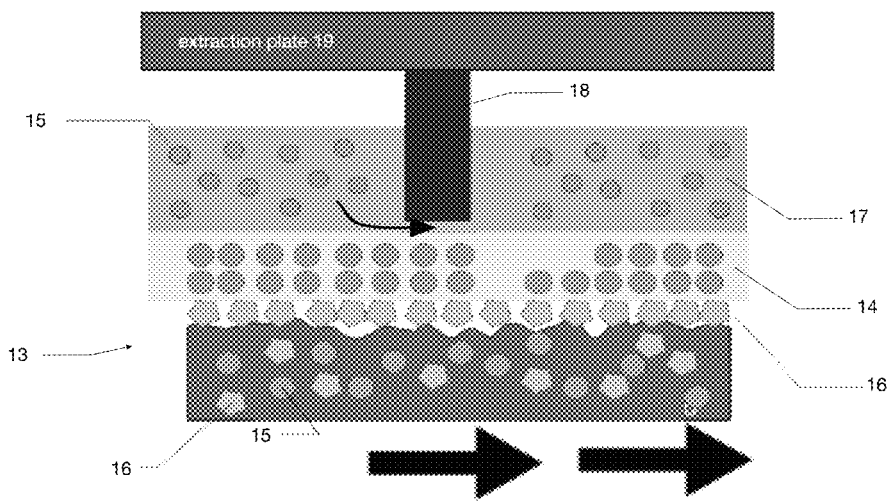

As shown in FIG. 3F, as the membrane 13 is displaced with respect to the area of the liquid polymer undergoing curing, it drags a volume of liquid polymer 17 from an adjacent area with it into the working area. Thus, by displacing the membrane 13 with respect to areas of the photo-curing liquid polymer undergoing progressive curing, not only is the layer of liquid lubricant under said area replenished, so too is the volume of liquid polymer under said area refreshed more quickly than would otherwise be the case if the membrane were not so displaced. This has the effect of alleviating the need for the system to interrupt the printing process for larger object cross sections being formed.

Methods of fabricating membrane 13 are discussed in the above-cited patent application. Membrane 13 is transparent to radiation used to effect photo-curing of the liquid polymer (which in some instances may be at 410 nm), and the layer of liquid lubricant is designed to move away from the sheet in the direction towards the photo-curing liquid polymer. The presence of membrane 13 results in a slow migration of the particles 15 of silicone oil, and more generally of lubricating material, towards the surface of the membrane, creating an extremely thin surface of inhibiting layer 14. Moreover, displacing the membrane in the fashion described herein ensures that an interface is maintained between the resin 17, which is still liquid, and the membrane 13, so that the resin, instead of coming into contact with the surface of the membrane 13, tends to float on the interface. The photo-curing process therefore occurs so that the object under fabrication is suspended on a lubricating inhibiting layer 14 of silicone oil, which helps to eliminate the suction effect between the object formed 18 and the membrane 13, eliminate the adherences between the object formed 18 and the membrane 13, reduce mechanical stresses introduced by the above-mentioned effects, reduce the mechanical stresses introduced by tilting, and allow a formation process in much shorter times than in conventional solutions. In effect, the object 18 does not need to be pulled from the tank base because it is already suspended above it, on the interface between the lubricating inhibiting layer 14 and resin/polymer 17. This suspension along with the above-described displacement of membrane 13, also allows the liquid polymer or resin 17 to refresh, whilst the extraction plate 19 raises to make space for newly cured formations. This helps to maintain continuous printing as the process need not be slowed or interrupted to allow for such refreshing of the liquid polymer.

The speed of displacement of the membrane may be adjusted so that the liquid polymer 17 infiltrates the working area sufficiently fast so that the layer which is being formed does not solidify before it has been able to completely temper all the new surface to be cured. The tempering speed depends on many chemical/physical characteristics of the resin in use (that is, of the photo-curing liquid polymer in use) and lowering the viscosity of said resin may tend to permit increases of the tempering speed. In addition, the doping of resin/polymer 17 with lubricating silicone oils 15 identical to those produced by the membrane 13 tends to improve the tempering speed.

Figure 4A:
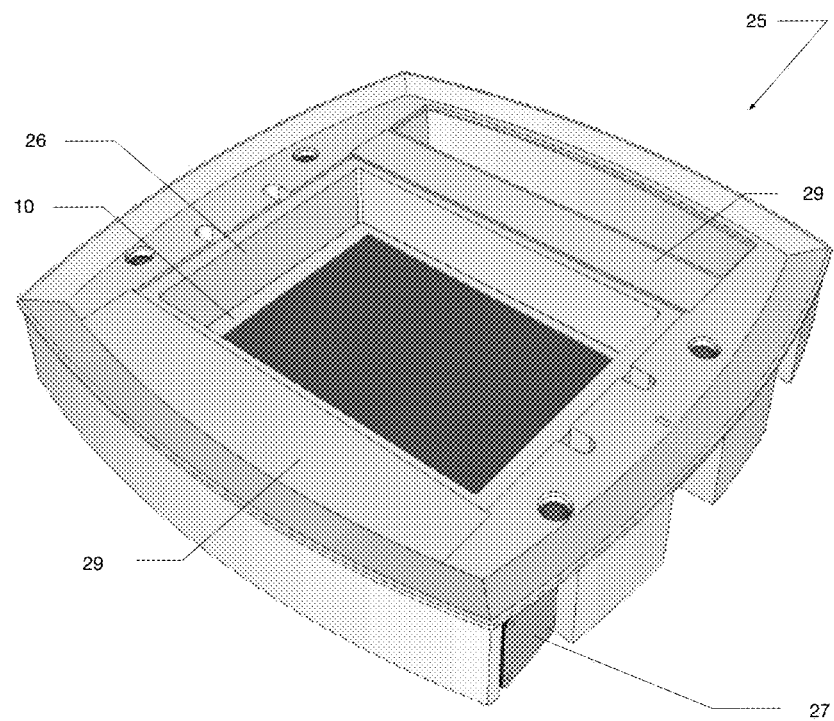
FIGS. 4A-4F show various view of a unibody tank assembly for an embodiment of the photo-curing apparatus of the present invention.
Figure 4B:
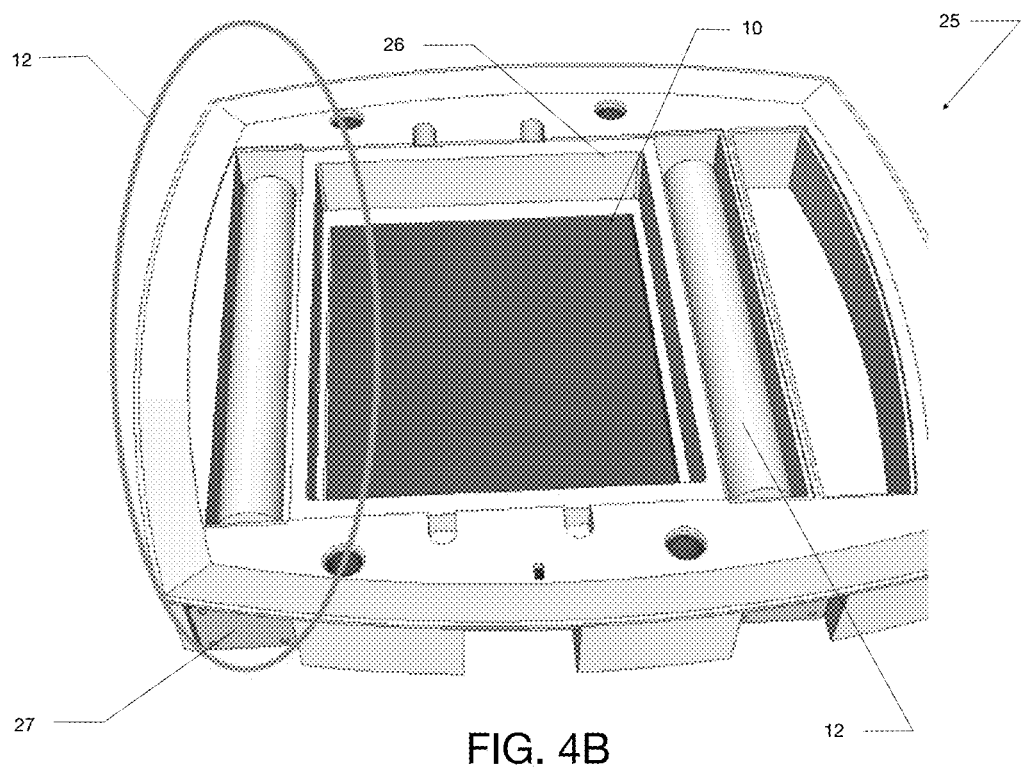
Figure 4C:
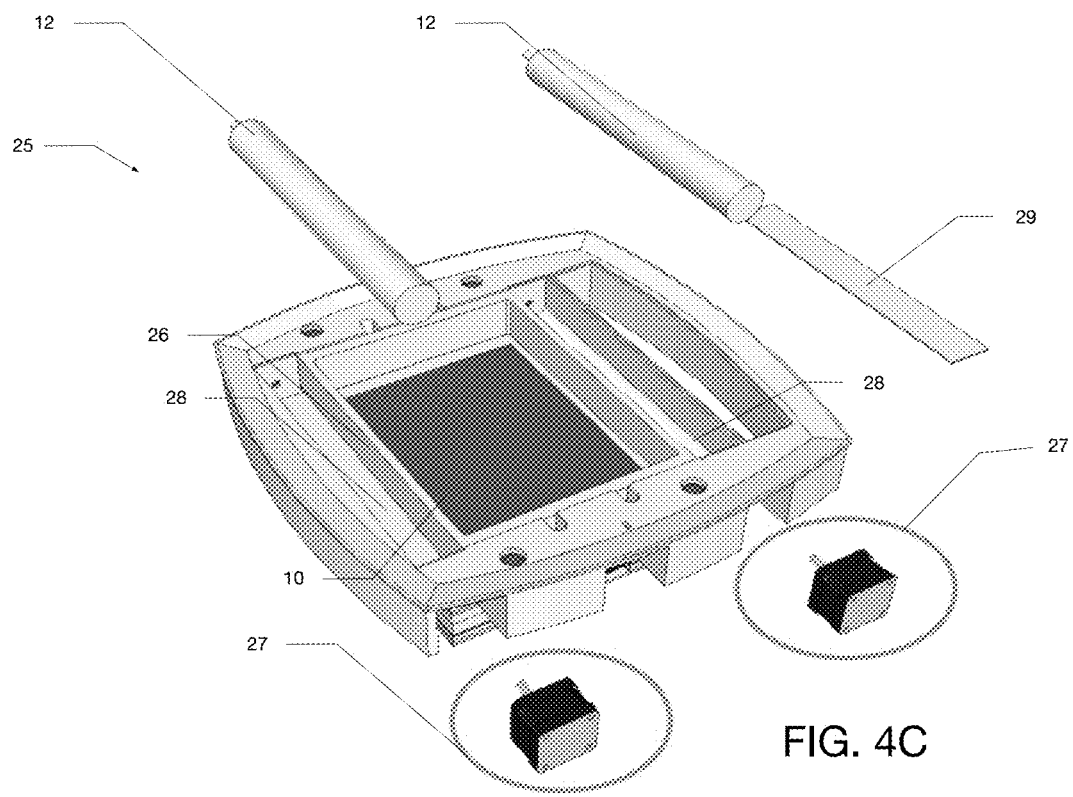
Figure 4D:
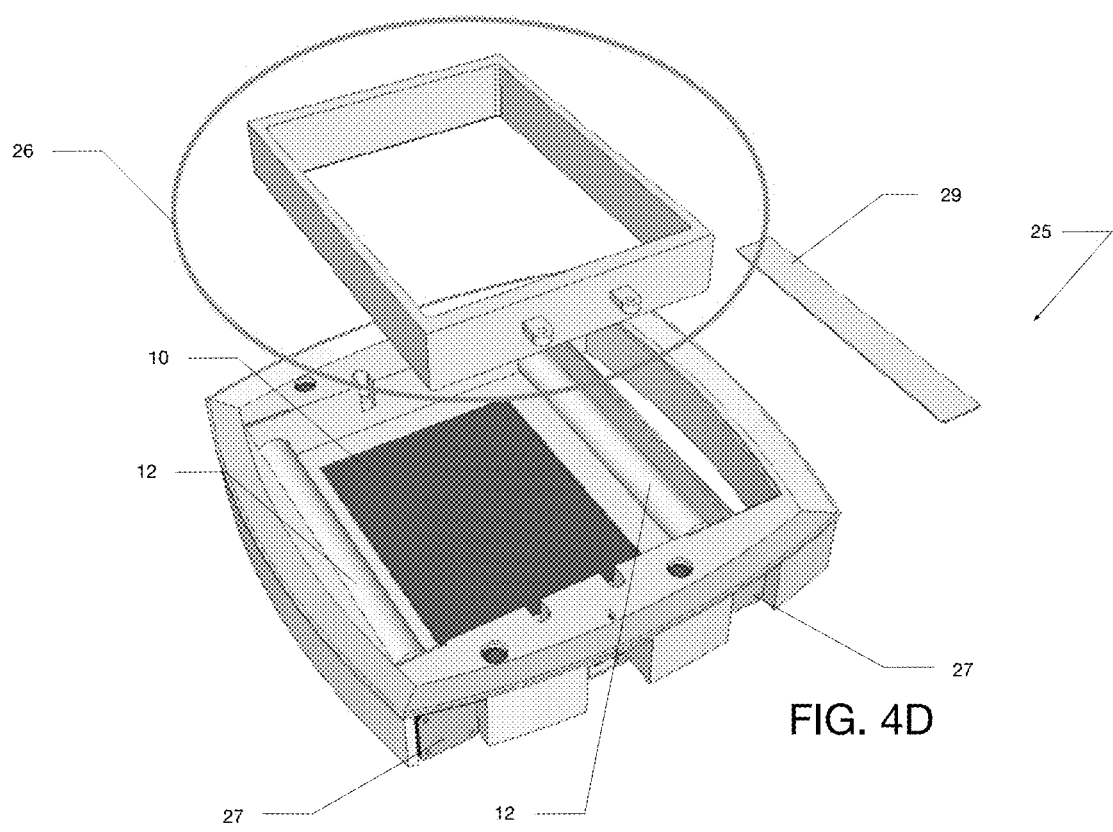
Figure 4E:
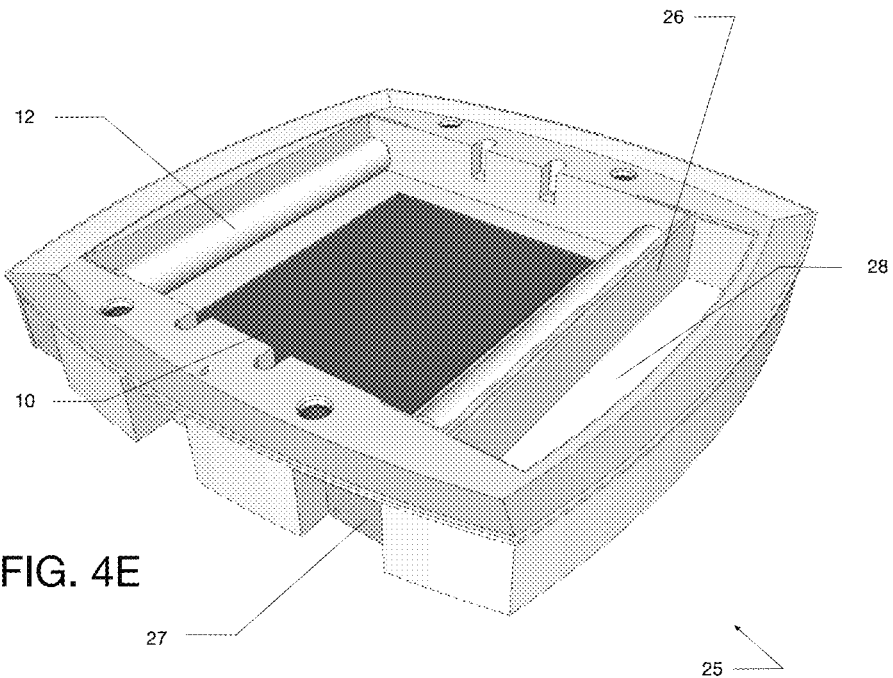
Figure 4F:
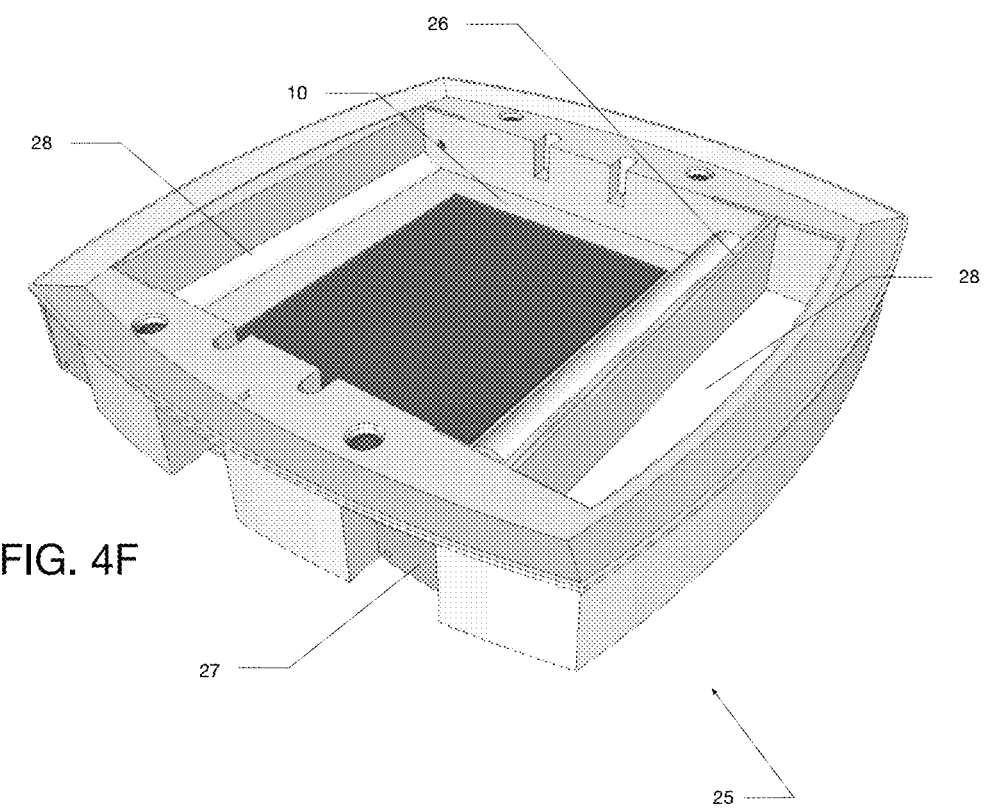

Referring now to FIGS. 4A-4F, various views of a modular tank assembly 25 for the printing apparatus are shown. Tank assembly 25 includes a mask 26, which defines the tank 10. Mask 26 includes a gasket (not shown) on its bottom perimeter to seal against membrane 13 as it moves underneath the mask between reels 12. Reels 12 are rotated by stepper motors 27 in unidirectional or bidirectional fashion to effect the displacement of membrane 13 between reels 12, as described above. FIGS. 4A and 4B are top perspective views of the tank assembly 25, FIGS. 4C and 4D are exploded perspective views of the tank assembly 25, showing details of the rollers 12 and stepper motors 27 (FIG. 4C), and the mask 26 (FIG. 4D), respectively, and FIGS. 4E and 4F are side perspective views of the tank assembly 25, showing positioning of a roller 12 (FIG. 4E) in a cavity 28 (FIG. 4F). When in use, reels 12 are covered by reel coves 29, which are removable for changing of the reels.

As shown in the illustrations, reels 12 are disposed in cavities 28 on opposite sides of mask 26. As illustrated in FIG. 1, membrane 13 is deployed between reels 12, through the underside of tank 10. As the extraction plate 19 (not shown in these views) is raised, stepper motors 27 rotate reels 12 in synchronized clockwise or counter-clockwise direction to displace a portion of the membrane 13 laterally with respect to the working area in tank 10 in which an object is undergoing fabrication. Reels 12 are maintained within the cavities 28 beneath covers 29 on axles or pins (not shown). The axle or pins may have slideably depressible ends maintained by internal springs or other means, to permit removal of old reels.

Figure 5:
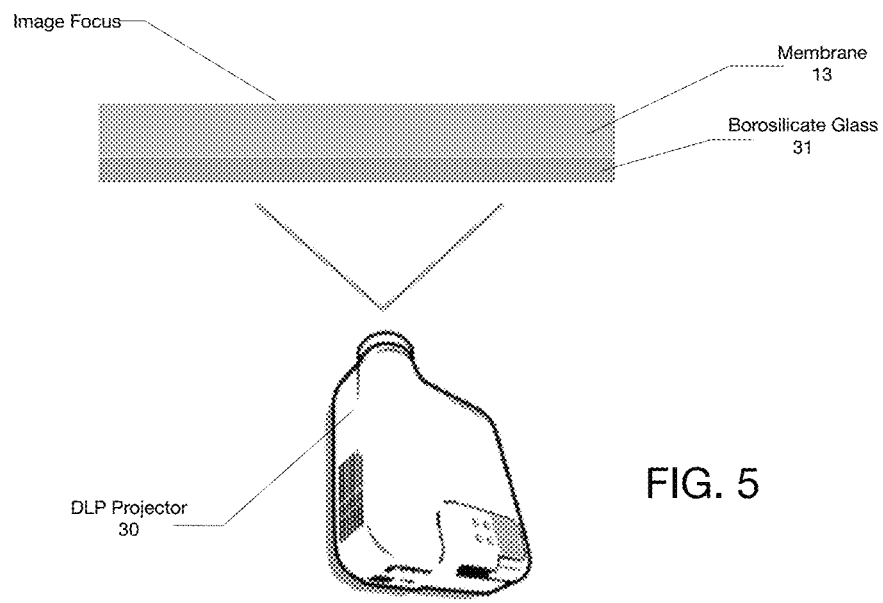
FIG. 5 shows an example of the use of a DLP projector in a photo-curing system employing a membrane.

As mentioned above, in the above-cited prior patent application a luminous flow from a digital light processing (DLP) projector was described. An example of such an arrangement is shown in FIG. 5. A DLP projector 30 produced a luminous flow through a layer of borosilicate glass 31 at the base of the tank. Membrane 13 is transparent to the radiation from DLP projector 30, which has an image focus plane at the top interface of membrane 13 with the liquid polymer (not shown). Photo-curing of the liquid polymer takes place at this interface, according to the projected image, and growth of the object under construction is thereby facilitated.

While this arrangement allowed for printing speeds on the order of 1.8 cm/min for layers of 200 micron thickness, it provided only limited x-y resolution (e.g., 75 microns). Further, because of the need for significant light intensities to cure the liquid polymer, the DLP projector 30 must be positioned close to the work space, limiting the area over which the liquid polymer curing can be effected (e.g., on the order of 120×90 mm). This proximity of the DLP projector to the work space also introduces optical aberrations and distortions in the focal plane.

Figure 6:
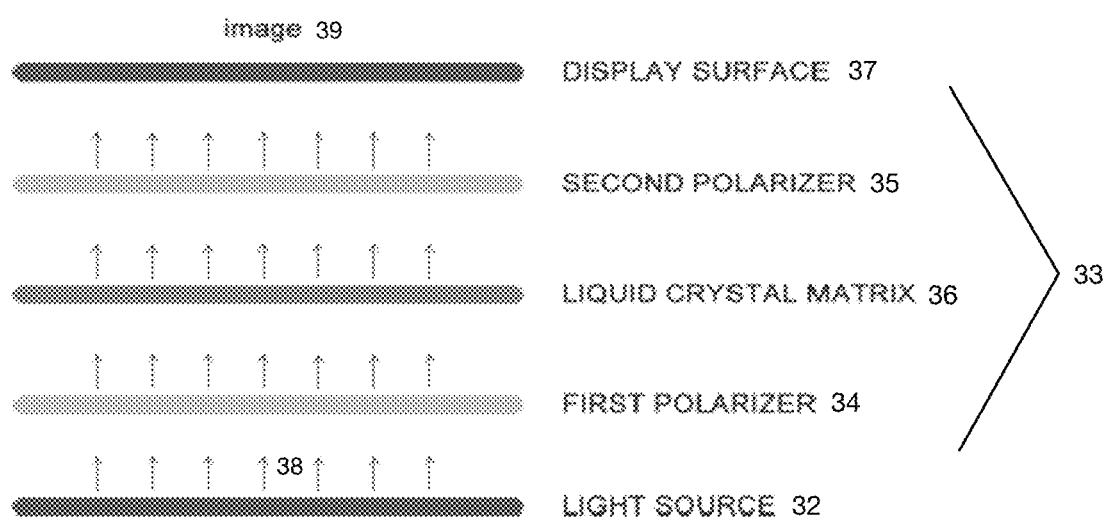
FIG. 6 shows a schematic view of the operation of a system for forming objects by photo-curing using a collimated light source and a liquid crystal display, in accordance with an embodiment of the present invention.

Embodiments of the present invention address these deficiencies by replacing the DLP projector with a collimated light source and using an LCD display as an imaging platform. FIG. 6 shows this arrangement. The light source 32 provides a collimated luminous flow of radiation 38, which in one embodiment is within a wavelength region of 400-700 nm, and more particularly is at 410 nm, through LCD panel 33 to produce an image 39. The LCD panel includes two polarizing layers 34, 35, sandwiching the liquid crystal matrix 36. The liquid crystal matrix includes a plurality of addressable pixels, which can be made individually transparent or opaque to the incident radiation. The effect of the incident radiation passing through the transparent ones of the crystals in the matrix forms the image 39 on the display surface 37. The individual crystals of the matrix 36 are made transparent or opaque by applying or not applying a voltage to a respective crystal, typically under the control of a processor or other controller that is provided a bit mapped (or other) version of the image for display.

The wavelength of light for the collimated light source is selected on the edge of the visible range of light because the polarizers of the LCD display typically act as UV filters. Many photo-curable polymers of the type used for 3D printing cure in the UV band. Using LCD imaging devices therefore presents a problem in conventional systems because the UV radiation would be filtered out by the polarizers of an LCD display. At the same time, resins which cure in the visible band typically cannot be used to achieve x-y resolutions in the image plane of approximately 50 microns or less. Instead, these systems typically achieve resolutions on the order of 100 microns. Accordingly, resins used in embodiments of the present invention are curable at centre wavelengths of approximately 370 nm, but still provide good curing characteristics at 410 nm, the preferred wavelength of the collimated light source.

Figure 7A:
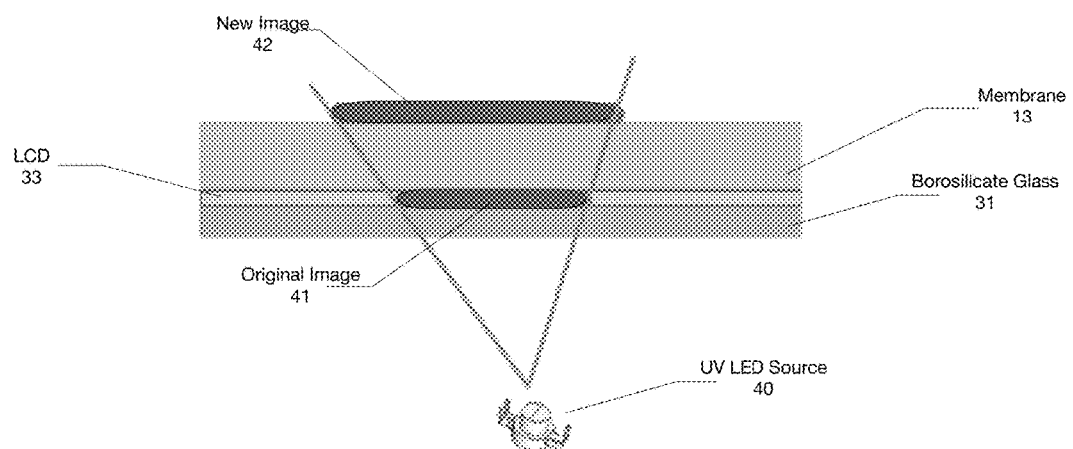
FIG. 7A shows an example of image distortions experienced using a point light source.

As noted, the preferred light source is a collimated light source and it is preferably produced by an array of individual light emitters. This is because point sources tend not to produce sufficient energy to effect curing of the resin, and further, cause distortions due to zoom effects, as illustrated in FIG. 7A. When a point source, such as a single UV LED 40, is used to illuminate an LCD display 33 in a photo-curing arrangement (for simplicity only the borosilicate glass 31 and membrane 13 of the arrangement are illustrated), the original image 41 becomes enlarged 42 at the image plane on the top surface of membrane 13. This is unsatisfactory because the enlarged image will tend to be irregular at its edges and of the wrong size.

Figure 7B:
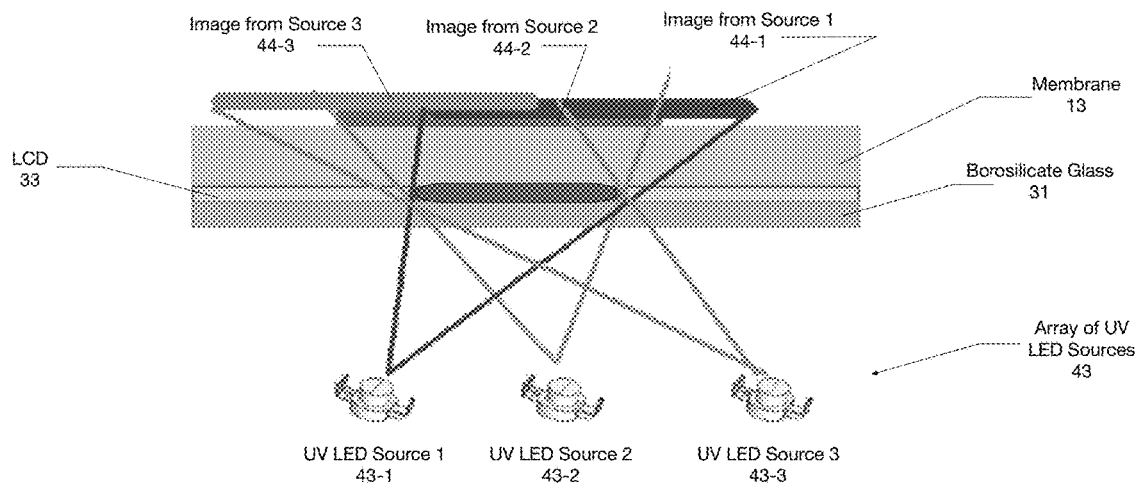
FIG. 7B shows an example of shadow effects created when using an array of point light sources.
Figure 8:
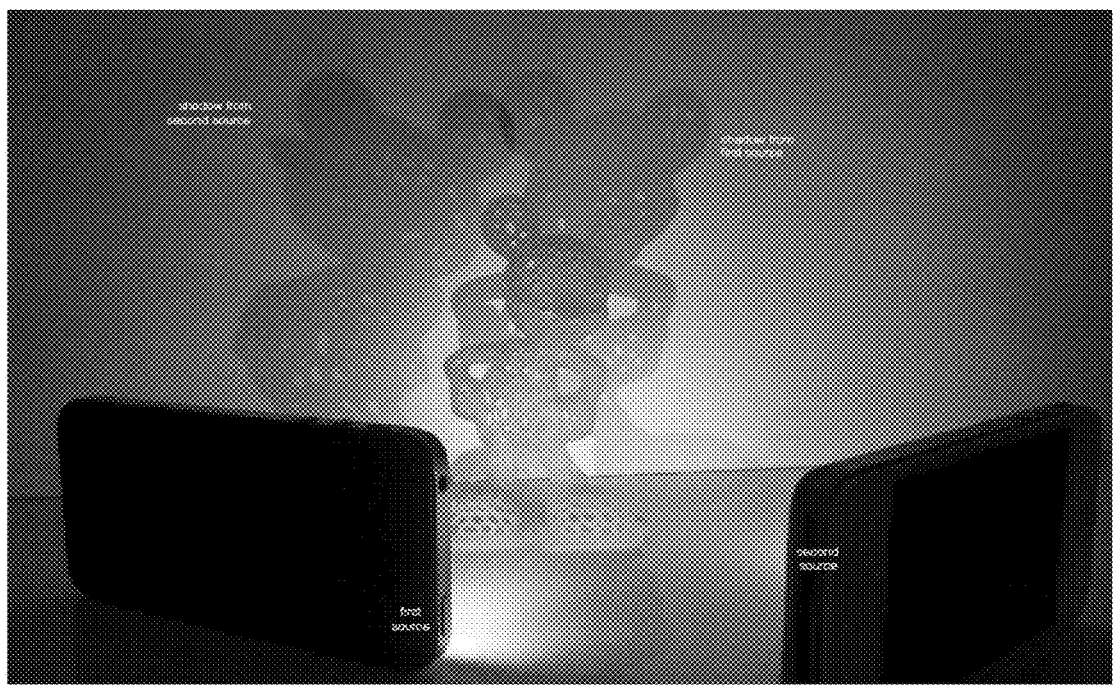
FIG. 8 shows a photographic image illustrating shadow effects created when using an array of point light sources.

Using an array of light sources is not, however, without its own challenges. The array of sources is needed to achieve sufficient energy to effect the photo-curing of the resin, but, as shown in FIG. 7B, causes shadowing as each individual source in the array will produce its own image (enlarged) in the image plane. An array 43 of individual LED sources 43-1, 43-2, 43-3, illuminates the LED display 33, which is disposed between the borosilicate glass 31 and the membrane 13. Each of these sources thus produces its own representation 44-1, 44-2, 44-3, of the image on the LCD display at the image plane at the interface between the membrane 13 and the photo-curing resin (not shown). These images are each enlarged and overlap one another, resulting in shadowing and other undesirable image effects. An example of a shadow effect for two light sources incident on a single object (such as the LCD image) is illustrated in FIG. 8.

Figure 9:
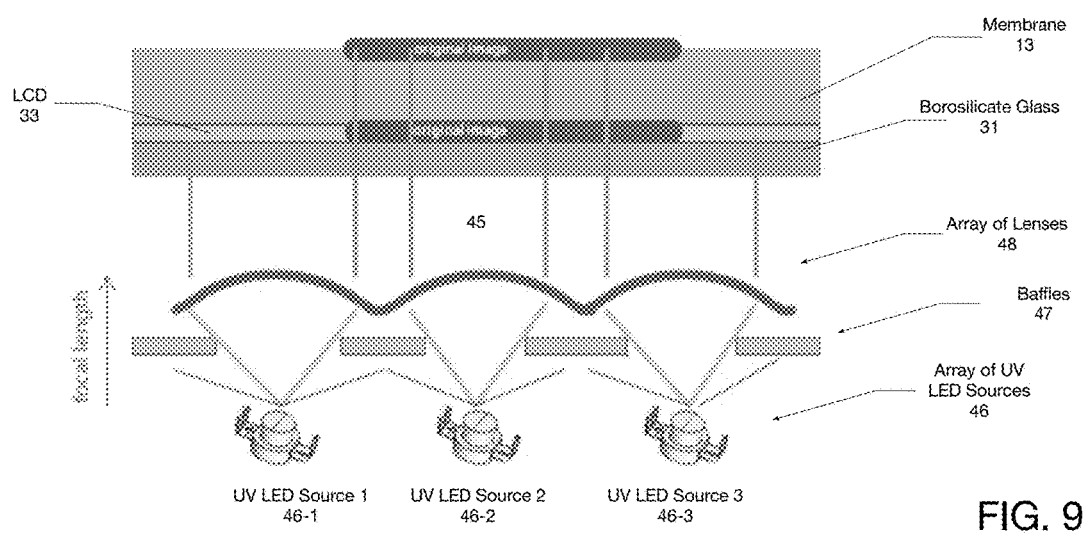
FIG. 9 shows a schematic view of the operation of a system for forming objects by photo-curing using a collimated light source made up of individual LED sources and a liquid crystal display, in accordance with an embodiment of the present invention.
Figure 10:
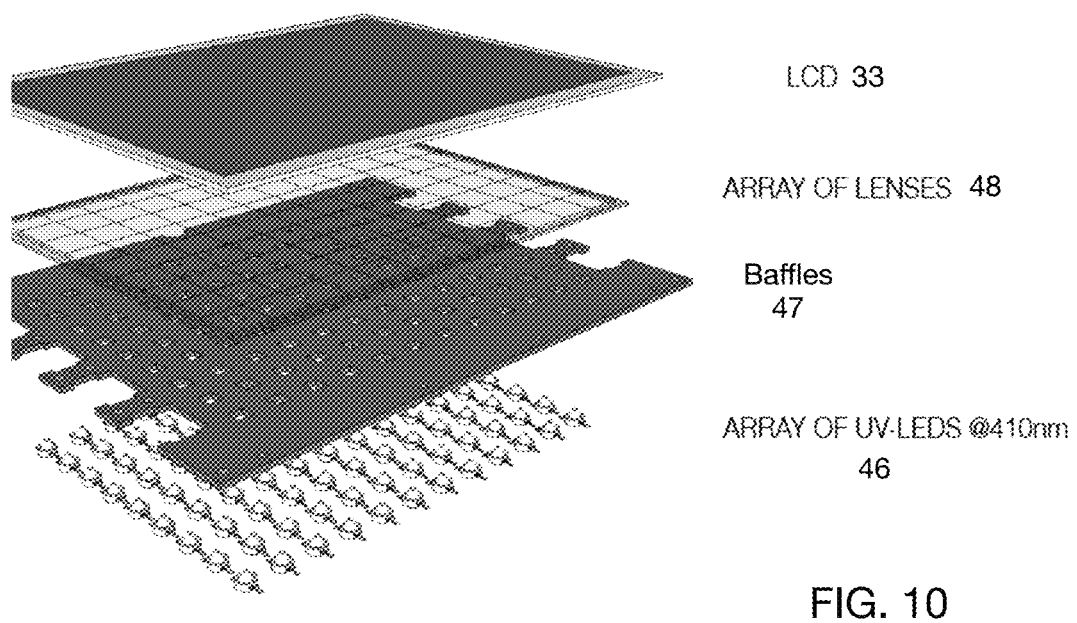
FIG. 10 shows an exploded view of the collimated light source made up of individual LED sources and the liquid crystal display, in accordance with an embodiment of the present invention.

Using a collimated light source eliminates these shadow effects, as shown in FIG. 9. A collimated luminous flow 45 is produced by an array 46 of individual LEDs, 46-1, 46-2, 46-3, using baffles 47 and an array of collimating lenses 48. The baffles 47 are arranged so as to limit the beam width of each individual LED source 46-1, 46-2, 46-3, to approximately the diameter of the lenses used in array 48. The array of lenses is placed one focal length away from each LED source, hence, the baffles are sized to accommodate such spacing. In one embodiment of the invention, a 9×12 array of LED sources is used. This is illustrated in FIG. 10, which shows in exploded view the array of LEDs 46, the baffles 47, each one corresponding to one of the LEDs, the array of lenses 48, one lens per LED, and the LCD display 33 via which the image to be printed is introduced. Referring back to FIG. 9, the collimated light produced by the array of lenses 48 ensure that the image from LCD 33 retains its original size when projected on the top interface of membrane 13, just below the bottom surface of the photo-curing liquid polymer (not shown). The LCD is under computer control so as to render a representation of the image of the cross section of the object to be printed such that the collimated light beam passes through those portions of the LCD not rendered opaque in the wavelength of the incident radiation and effects photo-curing of the liquid polymer in the work space of the apparatus immediately above the LCD. This arrangement affords high resolution in the x-y plane (e.g., on the order of approximately 50 microns or less, and in one embodiment approximately 30 microns), free from optical aberrations or distortions, while preserving rapid printing speeds. This high resolution collimated light source and LCD imaging system may be employed with the static membrane which produces the lubricant layer discussed in our prior patent application, or with the displaceable membrane described herein.

In one embodiment of the invention, the collimated light source produces a luminous flux of 250 mW/cm$^2$ at 410 nm that allows for printing of a 200 micron thick layer within approximately 2-2.5 seconds with an x-y resolution of approximately 30 microns, without distortions, using an LCD display of 840 dpi. The individual LED sources of the array are spaced at the focal length of the lenses of the lens array, which are also spaced one focal length from the LEDs; hence the baffles are each 1 focal length square.

The present invention is described by way of example only, without limiting the scope of application, according to its preferred embodiments, but it shall be understood that the invention may be modified and/or adapted by experts in the field without thereby departing from the scope of the inventive concept, as defined in the claims herein.

What is claimed is:

1. A method for forming a three-dimensional object by photo-curing a resin through exposure to a radiation, said method comprising:
   progressively curing layers of said resin in a space of a tank between a membrane containing dissolved polytetrafluoroethylene (PTFE) and transparent to said radiation and a supporting plate on which already formed portions of said object adhere so as to form said three-dimensional object in a layer-wise fashion, and progressively moving said supporting plate vertically away from said membrane as said three-dimensional object is formed;
   wherein:
      the progressive curing proceeds by irradiating said resin by an optical arrangement comprising a collimated ultraviolet light source including an array of light emitting diode (LED) sources, an array of baffles, and an array of lenses located one focal length from said array of LED sources, said baffles arranged so as to limit a beam width of each individual LED source in the array of LED sources to approximately a diameter of a lens of the array of lenses, the irradiation by the collimated ultraviolet light source passes through a liquid crystal display (LCD) having two polarizing layers sandwiching a liquid crystal matrix, the matrix including a plurality of addressable pixels, the LCD disposed between said collimated ultraviolet light source and said membrane, and the opacity of respective pixels of the plurality of addressable pixels of the LCD display is controlled such that a collimated light beam emitted by the collimated ultraviolet light source passes through portions of the LCD not rendered opaque; and during said forming, laterally displacing a layer of liquid lubricant comprising one of a fluoropolymer, a silicone oil, or a silicone oil and a fluoropolymer disposed between the membrane and the resin with respect to an area of said resin undergoing said progressive curing by said irradiation by the collimated ultraviolet light source, wherein said lateral displacement is effected by dispensing said membrane from a first reel and taking up said membrane on a second reel, said first reel disposed in a first cavity of a tank assembly, said second reel disposed in a second cavity of the tank assembly, wherein said first cavity is formed in part by a first sidewall of the tank and a first removable cover, wherein said second cavity is formed in part by a second sidewall of the tank and a second removable cover, said membrane is dispensed from the first reel by a first stepper motor disposed adjacent to and outside the first cavity, and said membrane taken up by the second reel by a second stepper motor disposed adjacent to and outside the second cavity.

2. The method for forming a three-dimensional object according to claim 1, wherein said membrane is made of a self-lubricating polymer in which said PTFE 15 dissolved.

3. The method for forming a three-dimensional object according to claim 2, wherein said self-lubricating polymer is a silicone polymer and said liquid lubricant is silicone oil.

4. The method for forming a three-dimensional object according to claim 1, wherein said lateral displacement occurs at times when said supporting plate is raised vertically away from said membrane.

5. The method for forming a three-dimensional object according to claim 1, wherein said LED sources emit radiation at a wavelength of 410 nm.

6. The method for forming a three-dimensional object according to claim 1, wherein the collimated ultraviolet light source produces a luminous flux of 250 mW/cm$^2$ at 410 nm.

7. The method for forming a three-dimensional object according to claim 1, wherein the collimated ultraviolet light source produces a luminous flux that allows for printing of a 200 micron thick layer within approximately 2-2.5 seconds with an x-y resolution of approximately 30 microns, without distortions using an LCD display of 840 dpi.

8. The method for forming a three-dimensional object according to claim 1, wherein the collimated ultraviolet light source produces a luminous flux sufficient for printing of a 200 micron thick layer within approximately 2-2.5 seconds with an x-y resolution of approximately 30 microns.

9. The method for forming a three-dimensional object according to claim 1, wherein said liquid lubricant is silicone oil with a viscosity of between 50 and 1000 mm$^2$/s.

10. The method for forming a three-dimensional object according to claim 1, wherein said liquid lubricant is silicone oil with a viscosity of between 300 and 400 mm$^2$/s.

11. The method for forming a three-dimensional object according to claim 1, wherein said membrane comprises a silicone-based polymer with a thickness between 0.50 mm and 2.50 mm, Shore hardness between 55 and 70, failure load from 8 to 10 MPa, and percentage elongation at failure from 300 to 400.

12. A method for forming a three-dimensional object in a tank of resin, the method comprising:

during fabrication of said object, at a bottom of the tank opposite a supporting plate on which already formed portions of said object adhere, replenishing a layer of liquid lubricant disposed below the resin with respect to an area of the resin undergoing curing by irradiation from a light source, the layer of liquid lubricant lying between a membrane containing dissolved polytetrafluoroethylene (PTFE) and the object, the liquid lubricant comprising a fluoropolymer, a silicone oil, or a silicone oil and a fluoropolymer;

wherein:

the curing by irradiation proceeds by irradiating said resin by an optical arrangement comprising a collimated ultraviolet light source including an array of light emitting diode (LED) sources, an array of baffles, and an array of lenses located one focal length from said array of LED sources, said baffles arranged so as to limit a beam width of each individual LED source in the array of LED sources to approximately a diameter of a lens of the array of lenses, the irradiation by the collimated ultraviolet light source passes through a liquid crystal display (LCD) having two polarizing layers sandwiching a liquid crystal matrix, the matrix including a plurality of addressable pixels, the LCD disposed between said collimated ultraviolet light source and said membrane, the opacity of respective pixels of the plurality of addressable pixels of the LCD display is controlled such that a collimated light beam emitted by the collimated ultraviolet light source passes through portions of the LCD not rendered opaque, and said replenishing of the layer of liquid lubricant is effected by dispensing said membrane from a first reel and taking up said membrane on a second reel, said first reel disposed in a first cavity of a tank assembly, said second reel disposed in a second cavity of the tank assembly, wherein said first cavity is formed in part by a first sidewall of the tank and a first removable cover, wherein said second cavity is formed in part by a second sidewall of the tank and a second removable cover, said membrane is dispensed from the first reel by a first stepper motor disposed adjacent to and outside the first cavity, and said membrane taken up by the second reel by a second stepper motor disposed adjacent to and outside the second cavity; and periodically moving the supporting plate vertically away from the layer of liquid lubricant to accommodate growth of said object in a space within the tank below the supporting plate.

13. The method for forming a three-dimensional object according to claim 12, wherein said membrane is made of a self-lubricating polymer in which said PTFE is dissolved.

14. The method for forming a three-dimensional object according to claim 13, wherein said self-lubricating polymer is a silicone polymer and said liquid lubricant is silicone oil.

15. The method for forming a three-dimensional object according to claim 12, wherein said replenishing of the layer of liquid lubricant occurs at times when said supporting plate is raised vertically away from said bottom of the tank.

16. The method for forming a three-dimensional object according to claim 12, wherein said LED sources emit radiation at a wavelength of 410 nm.

* * * * *